Feb. 8, 1955     E. E. LAKSO ET AL     2,701,671
TABLET COUNTER

Filed March 23, 1951     10 Sheets-Sheet 4

INVENTORS
EINO E. LAKSO
BY EUGENE E. LAKSO
ATTORNEY

INVENTORS
EINO E. LAKSO
BY EUGENE E. LAKSO

Charles R. Fay,
ATTORNEY

Feb. 8, 1955 E. E. LAKSO ET AL 2,701,671
TABLET COUNTER
Filed March 23, 1951 10 Sheets-Sheet 9

INVENTORS
EINO E. LAKSO
BY EUGENE E. LAKSO
ATTORNEY

United States Patent Office 2,701,671
Patented Feb. 8, 1955.

2,701,671

TABLET COUNTER

Eino E. Lakso and Eugene E. Lakso, Fitchburg, Mass., assignors to The Lakso Company, Incorporated, Fitchburg, Mass., a corporation of Massachusetts Application March 23, 1951, Serial No. 217,222

29 Claims. (Cl. 226—2)

This invention relates to new and improved apparatus for counting articles and filling containers therewith after counting, and the principal object of the invention resides in the provision of a tablet or article counter and container filling apparatus wholly under instant control of the operator and which is more accurate, less expensive to manufacture than those of the prior art, and easier and simpler to operate, manufacture, and service whereby many counting and filling operations, now done manually because of high cost of fully automatic machinery, may be substantially automatically accomplished at reasonable intial cost as compared with prior art automatic devices of similar nature.

In counting and filling containers with a plurality of relatively small articles such as pills and tablets, it has been the practice in the prior art to do this manually with the aid of "paddles," or fully automatically by the use of highly complex, high speed counting and filling machines employed for the purpose, such machines being extremely high in initial cost, relatively expensive in the upkeep thereof, and often inaccurate in count and in allowing broken and other unacceptable articles to pass.

In either case, it has always been a prime problem in the art to avoid broken tablets or other articles from getting into the containers since it is impossible to keep the breakage out of the hoppers or containers for manual operation, and accordingly it is one of the main objects of the present invention to provide an automatic machine as to the counting of the articles, including means for instant manual control of the operation of the filling mechanism, together with full visibility of the articles being counted so that malfunctions of the machine or any broken tablet or article is easily and quickly perceived in which case the operator fails to operate the filling mechanism, but instead quickly and easily removes the broken tablet or article or fixes whatever may have caused the malfunction, to the end that the containers are rapidly filled with whole and unbroken tablets or other articles, to the correct count.

A further object of the invention resides in the provision of full visibility for the counting apparatus, and easy operator-accessibility thereto so that upon the starving of a line of articles or any other interruption to the advance thereof, the operator need only refrain from operating the filling mechanism and cause all of the article conveyor guideways to be filled prior to operating the means for filling the containers with the accurately counted articles.

Another object of the invention resides in the provision of visible chutes which are constantly being refilled by an article conveying apparatus, in combination with a dumping means to fill containers of the counted articles, including an operating means therefor which can operate but once for each actuation of the operating means by the operator; that is, a switch is provided for energizing an electric device such as a solenoid to permit the revolution of a device in the nature of a one-revolution clutch, including means to prevent continued operation of the clutch to allow but a single dumping actuation for each distinct actuation of the switch.

Further objects of the invention include the provision of means to automatically discharge chips and broken articles prior to arrival at the platform, the provision of a vibratory device having special spout adjusting means for different sizes of articles, a specially designed guide plate which is easily removable and replaceable, and various adjustments and combinations of parts as will appear more fully hereinafter.

Other objects and advantages of the invention will appear hereinafter.

Reference is to be had to the accompanying drawings in which.

Figure 1:
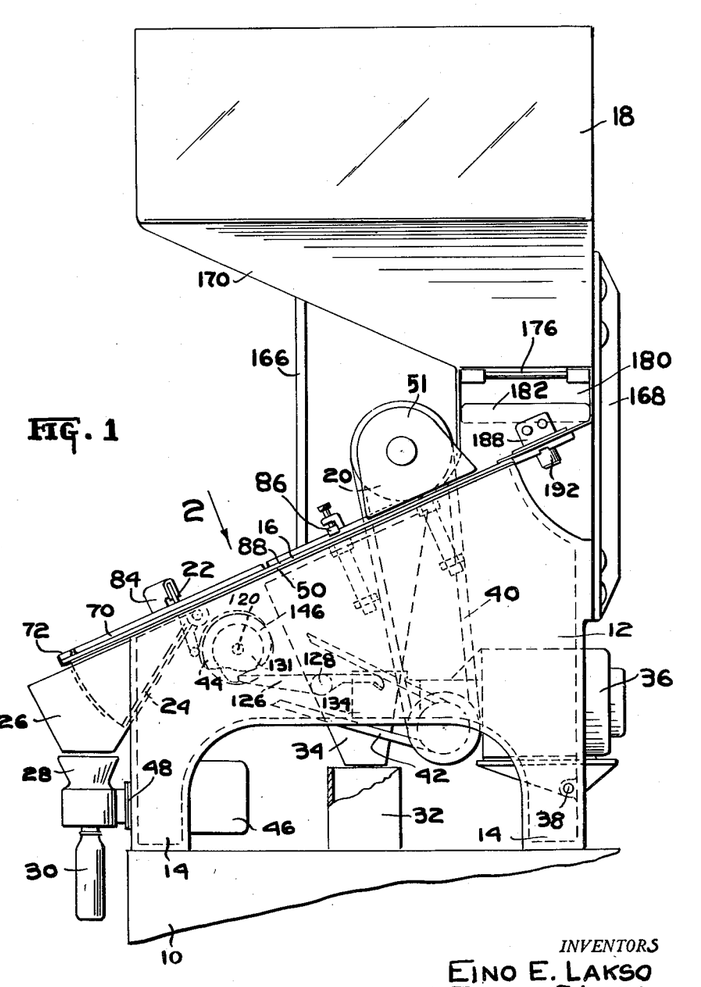
Fig. 1 is a view in side elevation showing the new machine and a container in the position to be filled thereby.

Referring now to Fig. 1, there is shown a base or bench 10 to support the apparatus forming the subject matter of the present invention. The machine under consideration may be provided with an adequate framework generally indicated at 12 supported by integral legs 14 or in any other adequate manner. The machine is seen to have a sloping surface as at 16 down which articles advance under influence of gravity from a hopper generally indicated at 18 and controlled and passing under a relatively soft surfaced roller 20 which operates to prevent undesired piling up of the articles at the exit throat at the lower end of the hopper, and to allow but a single layer of articles to exit to the sloping surface 16. In combination with guide means to be described, the roller aligns the articles so that they advance down the incline in side by side lines, see Fig. 2.

A reciprocatory gate-like device 22 stops certain of the articles thereabove, when it is desired to dump a certain number of the articles below the stop device 22 in the direction of travel of the articles. To this end the lower end of the surface 16 is formed as a pivoted table, dumping platform, or the like which upon positive actuation on the part of the operator, pivots downwardly to the dotted line shown in Fig. 1 at 24, whereupon all of the articles below element 22 are discharged into the chute 26, and thence into the spout 28 and from there into the container 30, the latter being held by hand by the operator, or by convenient means.

The element indicated at 32 is a container for waste articles which have dropped down through a chute 34 in a certain area of the surface 16 as will be later described, these waste articles being broken or otherwise in such a condition that they cannot reach the region of the gate 22 but instead fall through slots especially provided therefor as will be made more apparent hereinafter.

A motor 36 is mounted on the machine frame 12 as by a pivot 38 and this motor is provided with a belt 40 to drive roller 20 and another belt 42 to drive a pulley 44. The operation of motor 36 is continuous throughout the entire operation of the machine. A vibratory motor 46 is secured to the frame 12 and vibrates a spring support 48 upon which spout 28 is mounted, imparting short travel high speed vibration thereto to prevent jamming of articles at any time in the spout 28.

It is to be understood that the stop device 22 and the dumping platform 24 are intermittently operated together at the will of the operator, that is, it being desired to dump a number of articles into the container 30, the operator throws a switch which brings the stop 22 down, stopping the forward motion of articles above the stop and thereby allowing the descent of all of the articles on platform 24 to be deposited as described; however, the means by which these operations are effected are continuously operated as by pulley 44.

Figures 11, 12:
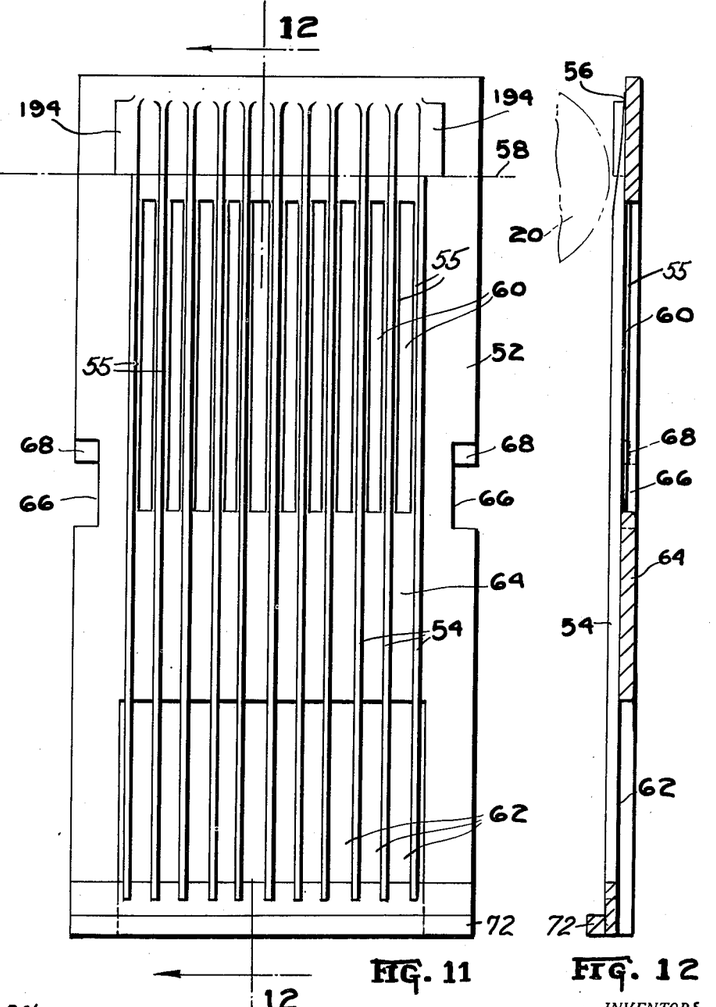
Fig. 11 is a plan view of a guide plate.
Fig. 12 is a section on line 12—12 thereof.

The reference numeral 50 indicates a top frame member forming the surface 16 and upon which the bearing blocks or other rotary supports 51 for roller 20 are mounted as well as other parts of the machine including a replaceable guide element hereinafter referred to as the plate and indicated generally at 52. This plate is shown in detail in Figs. 11 and 12. Plate 52 essentially comprises a series of spaced ribs 54 between which the articles pass in aligned relation; and under the roller 20 the ribs 52 taper gradually down to the surface of the plate at 56. The center line of the roller is indicated by the broken line 58 in Fig. 11. Plate 52 is slotted at 60 and open at 62 having a transverse solid portion between these areas at 64, and there are a pair of edge recesses 66 having shoulders 68 thereon for a purpose to be described. These articles, if full size and not broken, are edge supported at the sides of slots 60 by the ledges 55. Plate 52 is easily removable and replaceable.

Figure 2:
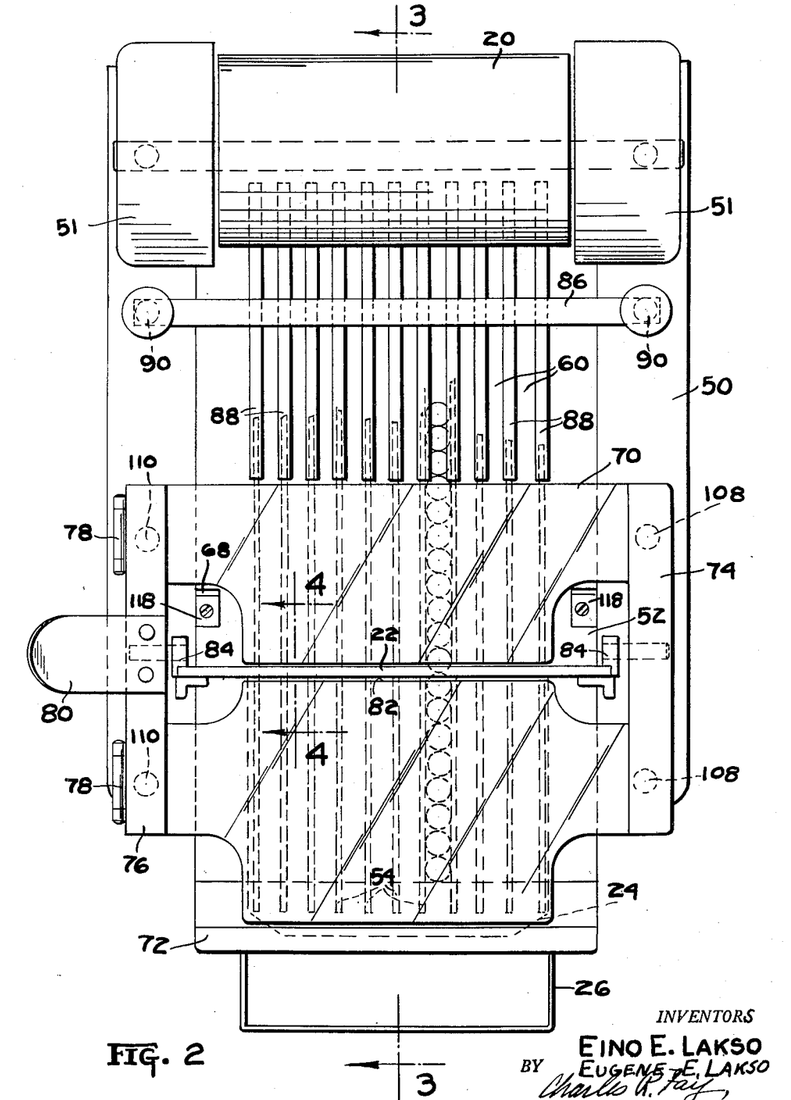
Fig. 2 is a plan view of the aligning and counting apparatus on an enlarged scale and looking in the direction of arrow 2 in Fig. 1.

Referring now to Fig. 2, the plate 52 is shown in position on the table top 50, and is partly overlaid by a transparent sheet or the like 70 through which the articles A are easily viewed as they descend, or are contained, in the chutes between ribs 54. Of course, at the open area 62 the articles are supported on the drop or dumping platform 24 and come to rest as by the lowermost or most advanced articles, against a ledge 72 on the plate 52. This ledge is preferably concaved at 73, Fig. 3, to prevent catching of the articles and to allow for a smooth drop of the articles as the platform 24 descends.

Figure 9:
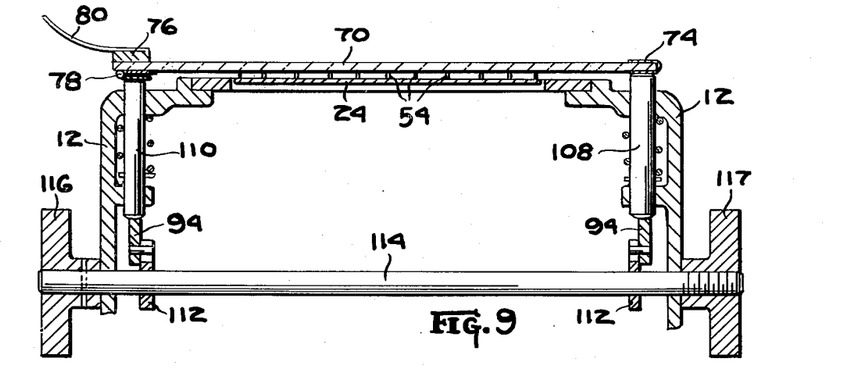
Fig. 9 is a section on line 9—9 of Fig. 3.
Figure 13:
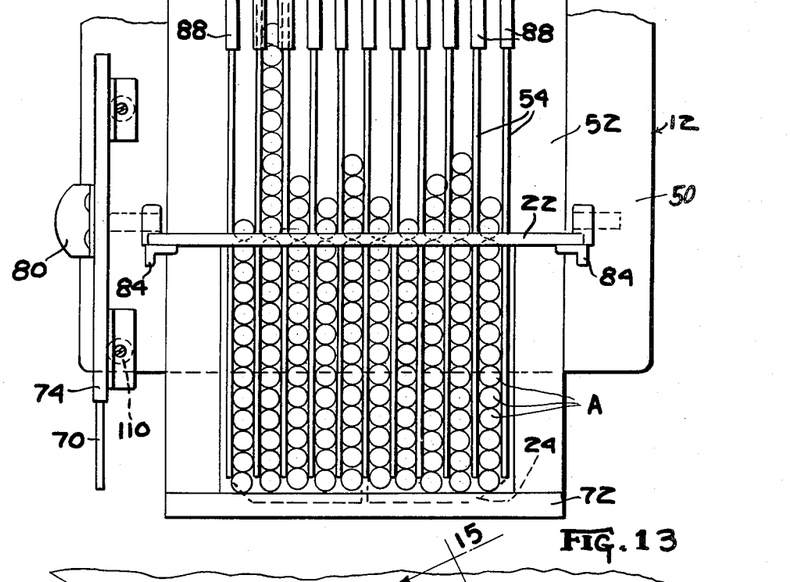
Fig. 13 is a plan view of the article guides with the transparent cover open.

The transparent cover 70 is provided with an edge reinforcing and finishing strip 74 at the right hand edge thereof as seen in Fig. 2 and has a similar strip 76 mounted on hinges 78 at the left hand edge, see also Figs. 9 and 13.

A thumb piece 80 provides for easy lifting of the transparent member 70 from the Fig. 2 position wherein it overlies the plate completely, to the Fig. 13 position which shows the transparent cover member completely open.

The transparent cover member 70 comprises two separate parts connected together by strips 74 and 76 and being spaced transversely thereof at 82 for accommodation therebetween of the reciprocatory stop member 22, the latter being mounted at both ends on vertically disposed members 84 which are adapted to be vertically reciprocated for the purpose of stopping the articles thereabove as already described. It is, therefore seen that the stop member 22 operates independently of the pivotable cover plate 70 through which the operator may observe the advance of the articles thereby being at all times fully aware of the correct or incorrect advance thereof, particularly as to whether the guides are full prior to dumping and whether the articles are broken, etc. In any case, where all of the guides formed by ribs 54 are not full of perfect articles, the operator may merely flip open cover 70 and remove a faulty article or tablet, or by the use of a pick dislodge a stuck tablet so as to ensure that all the guideways are filled up as required.

Figure 6:
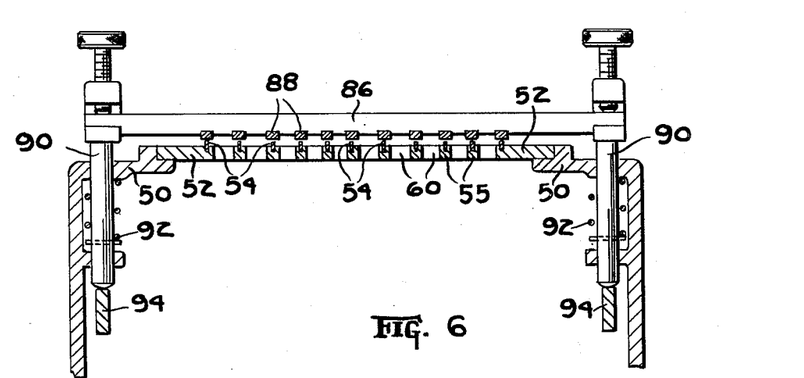
Fig. 6 is a section on line 6—6 of Fig. 3.
Figure 7:
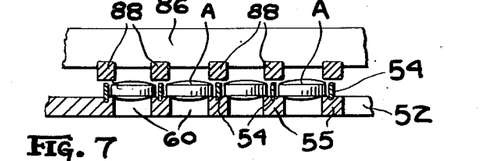
Fig. 7 is an enlargement of a section of Fig. 6, illustrating the articles in advancing relation.

As noted above, plate 52 extends upwardly to a point beyond the center line of roller 20 and at its upper end underlies a cross bar 86 which supports a series of parallel bars 88 overlying the ribs 54 and extending laterally thereof to each side, see Figs. 6 and 7. The plate 86 is secured at its ends on plungers 90 which are lightly resiliently urged downwardly by reason of springs 92 and are held in adjusted position by a bar 94 so that the exact spacing between bars 88 and ribs 54 is correctly maintained, see Fig. 3. The bars 88 act as guides and hold down means and prevent the articles from rising or buckling in strings upwardly during the passage of the articles past the openings 60 and down to the overlying cover 70 which then assumes the function of bars 88 but, of course, in a different manner. While the articles are passing under the bars 88, they will fall down through openings 60 if broken or of small size, and the whole articles are supported at each edge on the plate strips 55 forming the openings, the ribs 54 being narrower and set on the strips 55, see Figs. 6 and 7.

The roller 20 is mounted on a shaft 96 in bosses 98 of end members 51, the latter being supported on plungers 102 in turn resiliently held downwardly by springs 104 and held in correct position on bars 94. The roller 20 is preferably provided with a soft corrugated covering 106 so that it does not destroy any of the tablets no matter how fragile they may be. The strips 74 and 76 of the transparent cover member 70 are supported on similar plungers at 108 and 110 for vertical adjustment therewith by means of the bars 94, see Fig. 3, the bars 94 being movable longitudinally by means of rockers 112 operated by a shaft 114 having a hand knob exterior of frame 12 as at 16, see particularly Fig. 9. Turning knob 116 rotates shaft 114 and rocker 112. Knob 117 is a release and lock for the positioning of the bars 94. The various plungers 90, 102, 108 and 110 are all moved simultaneously and equally adjust the respective parts which they support for the purpose of accommodating articles of greater or lesser thicknesses.

Articles of greater or lesser width must be accommodated for by changing the plate 52 for another plate having greater or lesser spaces between the ribs 54. This is easily accomplished by reason of the fact that plates 52 are locked in position by the shoulders 68 which are slid under corresponding notches in members 118, see Fig. 4 and Fig. 2. All it is necessary to do to replace one of these plates is to move it back up the incline sufficiently to disengage the shoulders from the blocks 118, and then lift it out, and replacement is easily made by the reverse action.

Figures 3, 4:
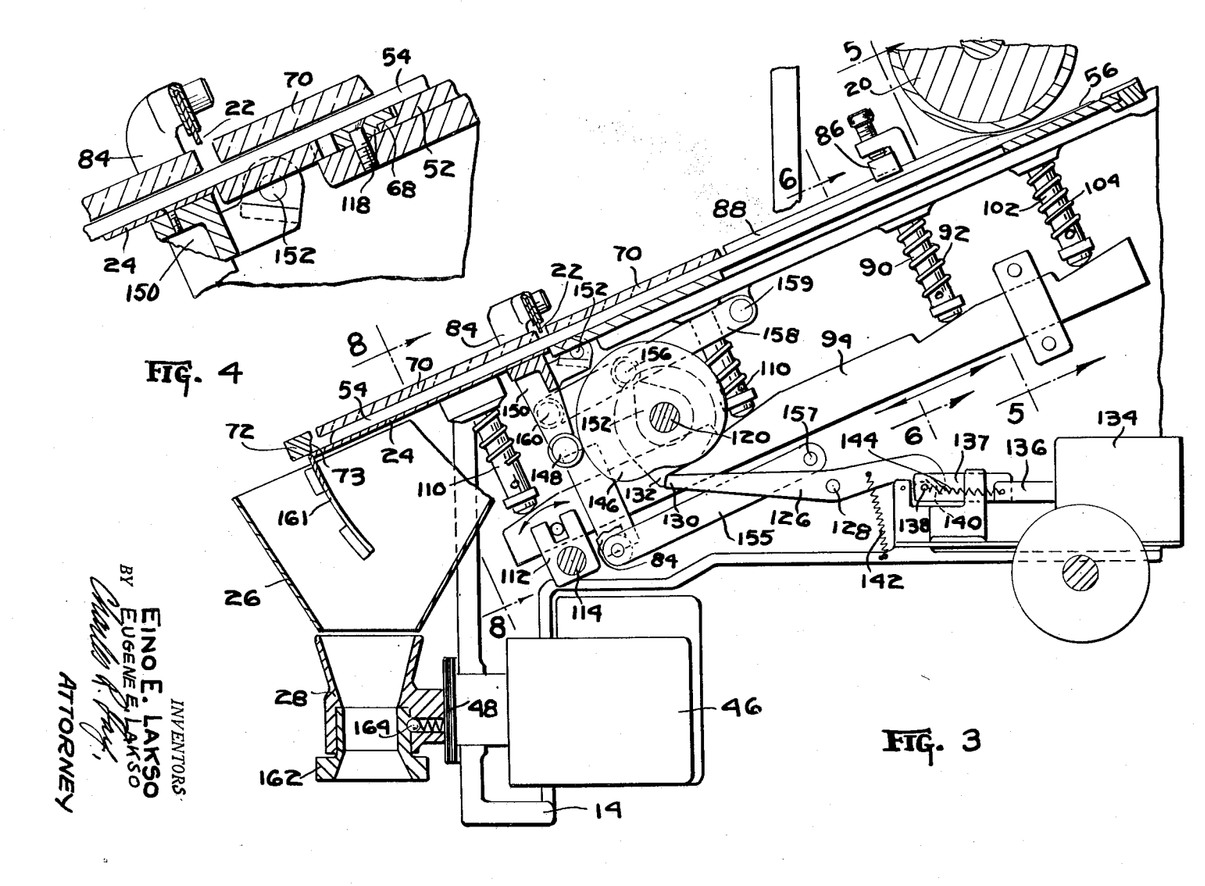
Fig. 3 is a section on line 3—3 of Fig. 2, and showing the spout vibrator, guard adjustment, and the solenoid shaft control means in elevation.
Fig. 4 is an enlarged section on line 4—4 of Fig. 2.
Figure 5:
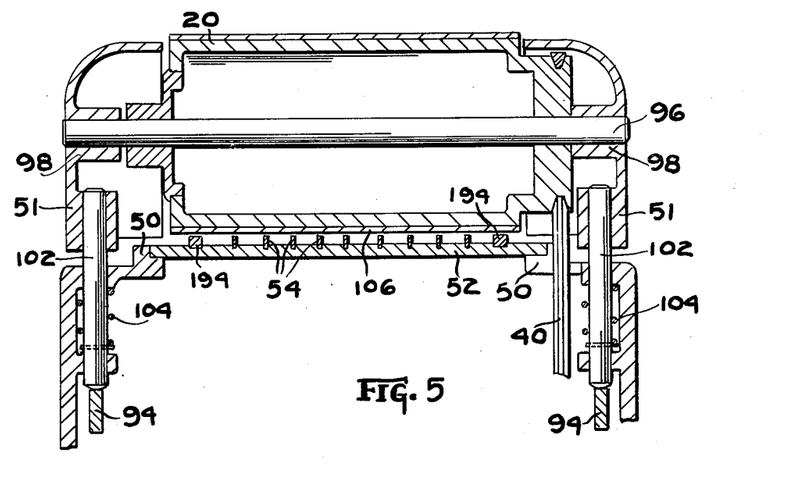
Fig. 5 is a section on line 5—5 of Fig. 3.
Figure 8:
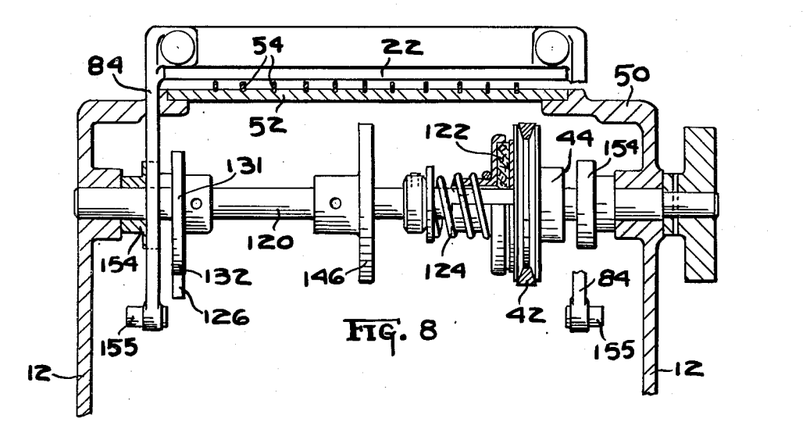
Fig. 8 is a section on line 8—8 of Fig. 3.

Referring now to Figs. 3 and 8, the pulley 44 is continuously rotated by reason of the belt 42 and between this pulley and shaft 120 there is provided a friction slip clutch 122 continuously urged toward closed relation by a spring 124 so that shaft 120 will also continuously rotate unless positively stopped.

Figure 19:
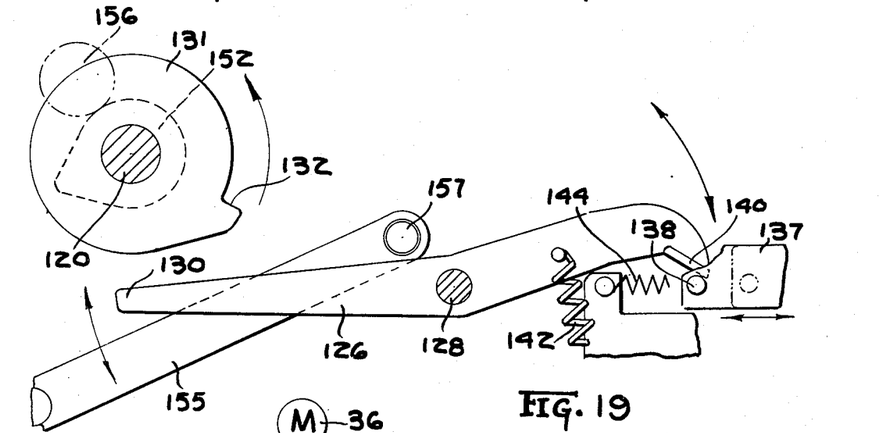
Fig. 19 is an enlarged diagrammatic view of the one revolution clutch control of Fig. 16.

Shaft 120 is stopped from rotation by means of a lever 126 pivoted at 128 and having a free end 130 engaging a projection 132 on a rotary element 131 secured to shaft 120. As seen in Figs. 3 and 19, shaft 120 rotates counterclockwise upon the retraction of the free end 130 of the lever 126 from stopping engagement with projection 132. This retraction is accomplished by a solenoid 134 which is operated by a foot switch by the operator, retracting the extending part or core 136 which has an articulated part 137 with a pin 138 thereon.

This retraction causes pin 138 to strike an angled shoulder 140 on lever 126 and knocks the same in counterclockwise direction sufficiently to retract the free end of the lever from the projection 132. Spring means is provided at 142 to immediately return lever 126 to original position, and pin 138 returns to the left in Fig. 3 under influence of springs 144. Pin 138 again engages the angled member 140 but this time rides up over it, having sufficient looseness in the part 137 to accomplish this. In other words, the retraction of lever 126 from projection 132 is never but momentary, and whether or not the operator keeps his foot on the switch actuating solenoid 34 or whether he removes his foot therefrom, the element 132 will never make but a single revolution of 360°, for each actuation of the foot switch.

Figure 21:
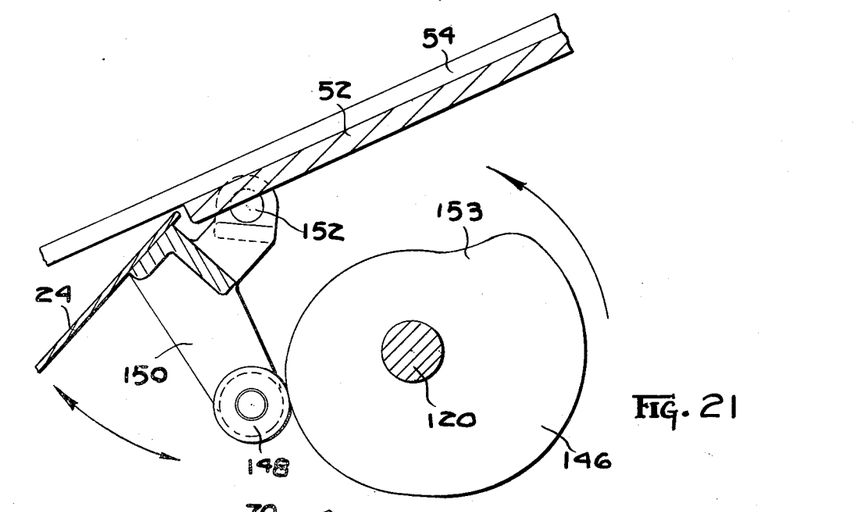
Fig. 21 is an enlarged showing of the drop platform cam control.

The shaft 120 is provided with two cams, one of which indicated at 146, bears against a cam follower 148 on a bracket 150 which contains a pivot pin 152 for the dumping platform 24. As cam 146 rotates in a counterclockwise direction, the low point 153 gradually approaches the follower 148 and this point represents the dumping platform 24, in downwardmost position, so the platform 24 descends to deliver the counted tablets to the spout 26. This descent is relatively slow so that the tablets slide therefrom maintaining their original in line positions and do not all become discharged in a bunch. This action provides for smooth filling of the containers and avoids jamming in the spout although the vibrator 46 also aids in avoiding such a condition.

The cams 154 have high points bearing against followers 156 on levers 158 pivoted to the machine frame at 159 and secured at 160 to members 84, supporting the stop member 22. As cam 146 rotates to provide for the descent of platform 24, the stop member 22 descends immediately engaging the next or initial row of articles which are not to be dumped until the next stop. It is clear that as platform 24 returns upwardly to the supporting position shown in Fig. 3, the cam 154 comes around again and pushes stop member 22 up out of engagement with the stopped tablets or articles and allows the gravity feed advance thereof once more.

Figure 22:
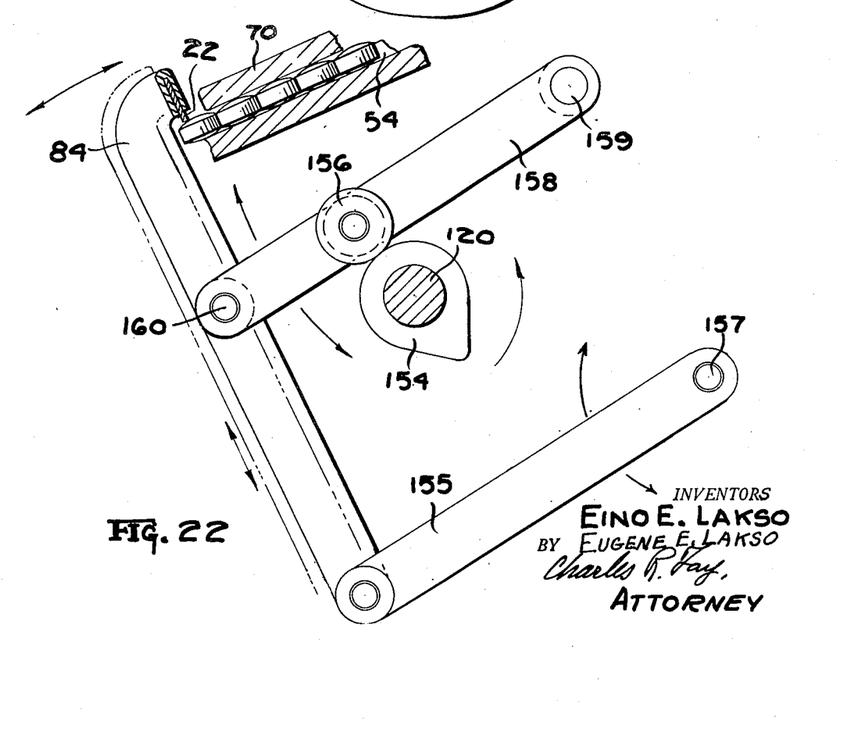
Fig. 22 is an enlarged showing of the stop element action.

The members 84 are preferably pivoted at 160 to the end of lever 158, and are thus capable of a slight swinging motion limited by a lever 155 pivoted to the members 84 and to the frame at 157. As the lever 158 rises and falls, the lever 155 swings the same. As stop member 22 descends, members 84 are swung in a clockwise direction in Figs. 3 and 22, thus slightly pushing all the lines of articles not to be dumped to the rear to make a space above the articles to be dumped. This action clearly divides the articles to be dumped and thus counted, from those not to be dumped and not yet counted. The stop 22 strikes the leading tablets near the leading edges thereof, so as not to slip thereon and pass the same by error.

The spout 28 may be provided with inserts 162 held in by snap means 164 and capable of assuming different interior throat sizes for different sizes of bottles or containers, see Fig. 3.

Figure 10:
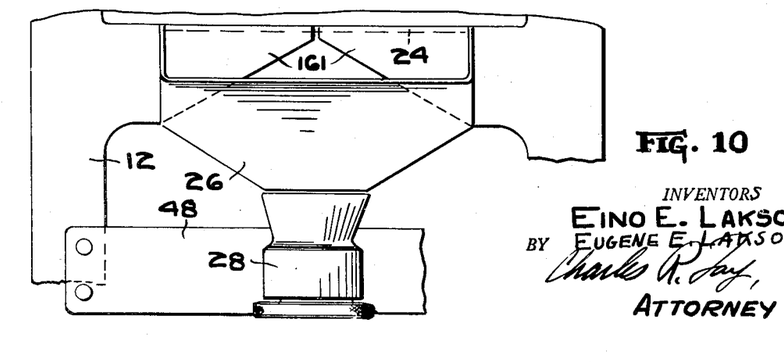
Fig. 10 is a front view of a single spout.
Figure 17:
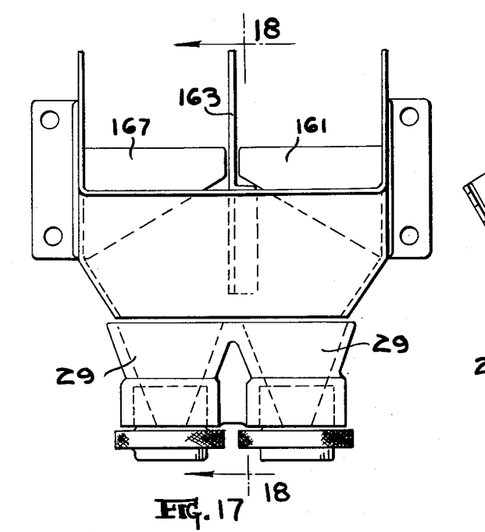
Fig. 17 is a front view of a double spout arrangement.
Figure 18:
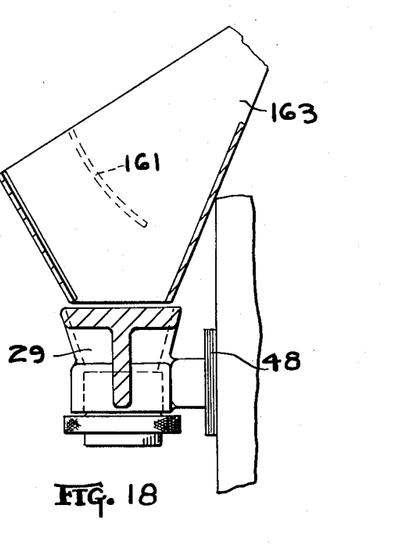
Fig. 18 is a section on line 18—18 of Fig. 17.

As the articles pass off platform 24, they impinge on a stop 161, of inverted V-shape, see Figs. 10 and 17. Thus the articles at the center are able to pass off the platform first, then the next outwardly located articles, and thus in gradual deposition from the center toward the sides. This clearly regiments the article descent, as well as the control of descent of the platform by cam 146, and completely avoids any tendency of the articles to jam in the spout or container neck. The spout 28 may be double, as at 29, Fig. 17, and in this case a center partition 163 is provided to insure against articles from one side accidentally falling to the other side. In such case, the platform 24 is centrally divided to accommodate the partition 163.

Figure 14:
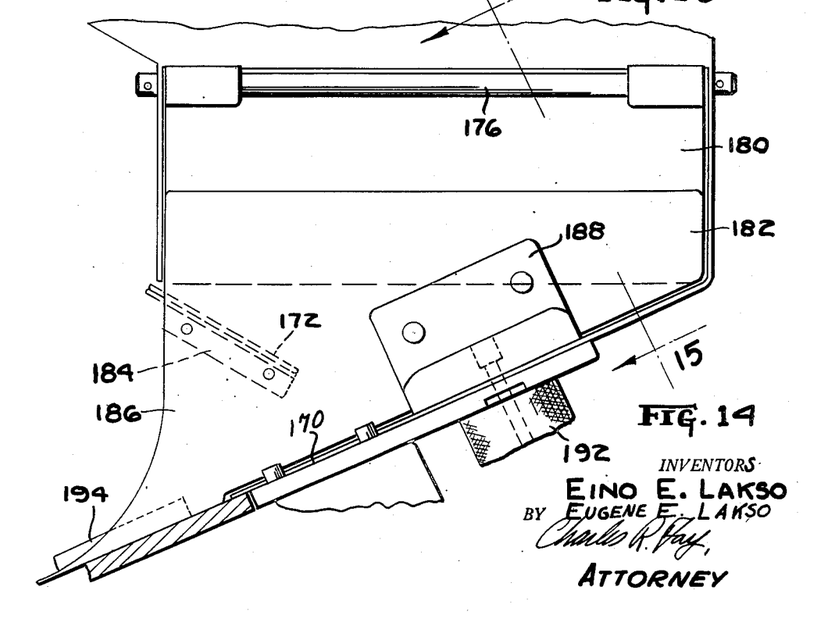
Fig. 14 is a side view of the lower portion of the hopper, part being in section.
Figure 15:
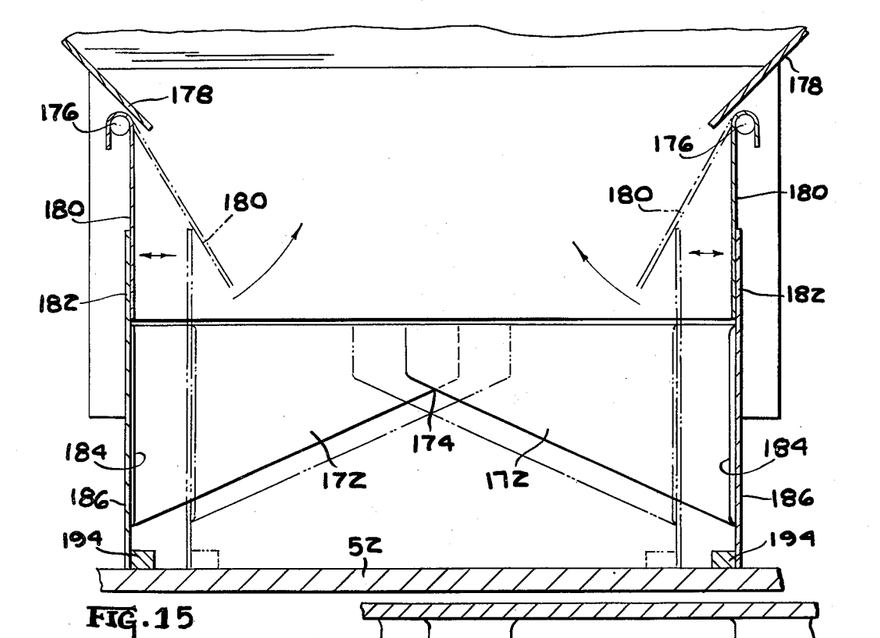
Fig. 15 is an interior view of the hopper showing the adjustable throat, parts being in section.
Figure 16:
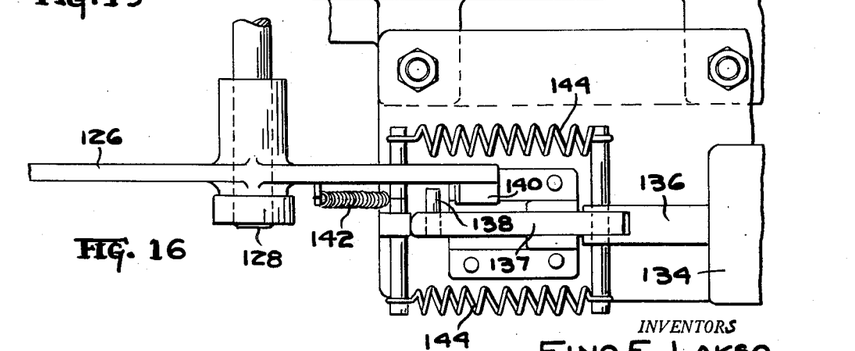
Fig. 16 is a plan view of the solenoid controlled one-revolution clutch lever.

The hopper construction is mounted on legs 166 and a rear support 168. The bottom of the hopper inclines downwardly at 170 and the interior of the hopper at the bottom thereof as best shown in Fig. 15 comprises a pair of wedge-shaped members 172 which are alike but reversed and overlap at their narrow ends as at 174 to provide a throat opening for the articles from the hopper to the roller, which opening is larger in the center and tapers downwardly towards the ends. Rods 176 are mounted on the sides of the hopper at the bottom just underneath inwardly directed slanting members 178, and pivotally depending from these rods are swingable hopper sides 180 engaged by upstanding members 182 connected to the wedge-shaped members 172. The latter have flanges 184 terminating in legs 186 and are adjustable transversely of the hopper by means of blocks 188 provided with screws 190 and thumb pieces 192, see Fig. 14, by which means they are adjusted in toward each other until the feet 186 abut against blocks 194. The latter are arranged on plates 52 according to the sizes of the plates so that each plate will be provided with its own adjustment of hopper bottom. This also provides a hopper which is bound to feed the articles or tablets in the smoothest and evenest possible manner so that all of the guideways down which the articles or tablets progress will be evenly filled.

Figure 20:
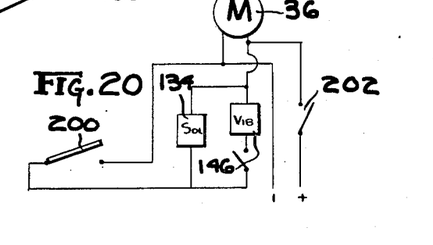
Fig. 20 is an electrical diagram.

Fig. 20 shows an electric circuit for the apparatus, the foot switch being indicated at 200 and energizing the solenoid 134 and vibrator motor 146 at the same time. The motor 36 runs at all times regardless of the condition of foot switch 200, and is stopped only by opening the switch 202. The vibrator may be cut out by opening switch 204, but this does not affect any other operation.

It will be seen that with the counting and filling machine of the present invention the operator merely charges the hopper, grasps a bottle or other container, or two of them in case of the double spout, and applies the same to the spouts as shown in Fig. 1. Thereupon, glancing at the surface 16 of the machine through the transparent cover 70, to make sure that all of the lines of articles are complete with perfect articles, the foot switch is stepped upon to operate the solenoid as above described thus depositing the articles in the containers. Automatically, the platform 24 rises again, the stop member 22 which had come down as described and stopped the advancing articles, again rises, and the chutes again become full, whereupon the operator sets down the filled bottles and applies fresh ones to the spouts. Of course, a large bottle may be filled by operating the depositing platform more than once. It is to be noted that the platform 24 is plane and that it together with the ribs 54 provides the chutes that the operator must make sure are uniform and full.

Figure 23:
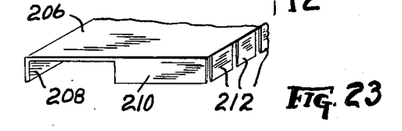
Fig. 23 is a perspective view of an article stop for the guideways.

Fig. 23 illustrates a stop for location over bar 72 to extend a short way up the plate so as to block off a part of each guideway. This stop comprises a member 206 having a flange 208 and end locating means 210. At its forward edge it is provided with downturned tabs 212 which provide slots therebetween for the reception of the bars 54, the tabs 212 extending down into the spaces between the bars 54 and thus permitting a lesser number of articles to be deposited each time by dumping platform 24.

A single plate 50 could be used to handle both ⅜ and 13/32 tablets but the latter would take up more room lengthwise between bars 54 than would the former and, therefore, the novel stop means is necessary to achieve the correct count for the smaller size of tablet.

Having thus described our invention and the advantages thereof, we do not wish to be limited to the details herein disclosed otherwise than as set forth in the claims, but what we claim is:

1. Article counting apparatus comprising a holder for the articles, means aligning the articles into a line for longitudinal advance thereof from the holder, a movable platform intermittently operable to transfer a predetermined number of articles, means stopping the line of advancing articles short of the platform, means connecting the platform and stopping means for simultaneous operation, means to initiate said operation at the will of the operator, a spout receiving the articles transferred, and fixed means to stop the articles in counted position on the platform, the latter moving away from said fixed means when operated to release the articles.

2. Article counting apparatus comprising a holder for the articles, means aligning the articles into a line for longitudinal advance thereof from the holder, a movable platform intermittently operable to transfer a predetermined number of atricles, means stopping the line of advancing articles short of the platform, means connecting the platform and stopping means for simultaneous operation, means to initiate said operation at the will of the operator, a spout receiving the articles transferred, means on the spout to receive a container mouth in position to receive the articles, means to maintain the platform at article holding position, and means to cause the platform to move to transfer the articles and return in a single cycle.

3. Article counting apparatus comprising a hopper, article aligning means leading from the hopper, a dumping platform receiving the line of aligned articles, means maintaining the platform in article receiving position, operator operated means to dislodge said second named means to cause the platform to dump and discharge the articles, and return to original position, and means to cause said second named means to re-lodge in platform holding position until the operator again actuates the operator operated means.

4. The apparatus of claim 3 wherein said dislodging and re-lodging means comprises a single revolution clutch.

5. Article counting apparatus comprising a hopper, article aligning means leading from the hopper, a platform receiving the line of aligned articles, means maintaining the platform in article receiving position, operator operated means to dislodge said second named means to cause the platform to move to discharge the articles, and return to original position, and means to cause said second named means to re-lodge in platform holding position until the operator again actuates the operator operated means, said second named means including a cam providing for the platform at a relatively slow speed.

6. Article counting apparatus comprising a hopper for the articles, means to align articles issuing from the hopper, a guideway for the aligned articles, a platform forming a part of the guideway, means normally maintaining the platform in article supporting condition, a single revolution clutch device, a cam operated thereby to move the platform and return the same to original position, and means under control of the operator to energize the clutch device at will, said last named means being capable of operation only upon a separate actuation for each revolution of the clutch.

7. The apparatus of claim 6 wherein the cam supports the platform at all times and allows the same to drop in a predetermined time cycle relative to the revolution of the clutch.

8. Article counting apparatus comprising a hopper for the articles, means to align articles issuing from the hopper, a guideway for the aligned articles, a platform forming a part of the guideway, means normally maintaining the platform in article supporting and receiving condition, a single revolution clutch device to move the platform and return the same to original position, and means under control of the operator to energize the clutch device at will, said last named means including an electric switch and a solenoid controlled thereby, an operating connection between the solenoid and the clutch to cause actuation of the latter upon actuation of the former, and means to return the operating connection to clutch stopping position regardless of the condition of the solenoid.

9. Article counting apparatus comprising a guideway chute for a line of in-line articles, a portion of the guideway being pivoted to drop the articles thereon therefrom, means to stop the advance of articles to fill the pivoted guideway, means to stop following articles prior to the pivoted guideway portion, means to provide for pivoting of the platform, the last two means being simultaneously actuated, and operator controlled means actuating the last two means for a single cycle only for each actuation of the operator controlled means to drop the pivoted part of the guideway to free the articles thereon and return the pivoted part to original position.

10. The apparatus of claim 9 including a transparent cover on the guideway covering the pivoted portion thereof, said cover being movable to lend access to the articles on the pivoted portion.

11. Article counting apparatus comprising a hopper, aligning means for the articles including a guideway leading from the hopper, means above the guideway holding the articles therein against loss from the guideway, a portion of said means comprising a movable transparent cover, the latter being easily opened to service broken articles or a starving line of articles in the guideway, said transparent cover having a cross-slot, a stop extending into the slot, means to raise and lower the stop to release or engage the articles, a dump platform operable to deposit articles having passed the stop, and means to operate the latter and platform simultaneously.

12. Article aligning apparatus comprising a hopper, a plate, a series of parallel spaced ribs extending therefrom, a bar for each rib in spaced parallel relation thereto thereabove, each bar extending laterally beyond the sides of the ribs, there being spaces between the ribs of less width than the rib spacing for dropping broken pieces or articles that are too small to bridge the said spaces.

13. The apparatus of claim 12 including a platform at the delivery end of the ribs, the articles passing thereonto after passing over the spaces, and means to provide for moving the platform to drop the articles thereon to a container.

14. The apparatus of claim 12 including a platform at the end of the ribs, the articles passing thereonto after passing the spaces, means to provide for moving the platform to dump the articles thereon, and means simultaneously operated with the drop platform to stop articles in advance of the platform.

15. Article counting apparatus comprising a hopper, aligning means for the articles including a guideway, hold-down means above the guideway holding the articles therein against loss from the guideway, a portion of said means comprising a movable transparent cover, the latter being easily opened to service broken articles or a starving line of articles, and means to simultaneously vertically adjust the cover and the hold-down means relative to the guideway to accommodate articles of different thicknesses.

16. Article counting apparatus comprising a frame, a hopper thereon, a plate leading from the hopper, the plate being removably mounted on the frame and including a raised ribbed area, spaces between the ribs, means supporting articles over the spaces while the articles are guided by the ribs, the latter being gradually reduced in height to the surface of the plate in the area of the hopper.

17. Apparatus of the class described comprising a frame, a rotary shaft thereon, means to rotate the shaft, a friction clutch, a cam shaft driven by the latter, means holding the cam shaft against rotation, an article transfer platform, a cam on the cam shaft normally holding the platform in article retaining position, means to interdict the action of the means holding the cam shaft, and means to return the latter to cam shaft holding means regardless of the operation of the interdicting means so that upon initiation of rotation of the cam shaft the same may rotate once completely only, moving the platform to article dropping position and returning the platform to original position.

18. The apparatus of claim 17 wherein the cam shaft holding means includes a radial projection, a lever having an end engaging the projection, means yieldingly holding the lever in this condition, and means at the will of the operator to displace the lever to allow the projection to pass.

19. The apparatus of claim 17 wherein the cam shaft holding means includes a radial projection, a lever having an end engaging the projection, means yieldingly holding the lever in this condition, means at the will of the operator to displace the lever to allow the projection to pass, said last named means overrunning the lever so that the yielding means replaces the lever in the path of the radial projection and stops the cam shaft after a single rotation only.

20. Apparatus of the class described comprising a frame, a rotary shaft thereon, means to rotate the same, a friction clutch driven by the shaft, a cam shaft driven by the clutch, a pair of cams on the cam shaft, means yieldingly holding the cam shaft against rotation, operator controlled means to release the cam shaft holding means, a dropping platform to receive counted and inspected articles thereon, means guiding articles to the platform, one of the cams holding said platform in article receiving position and upon rotation providing for a controlled drop and return thereof, a cross bar for intermittently stopping articles proceeding to the platform on the guiding means, the cross bar being controlled by the second cam for timed operation with the platform so that the latter drops only a predetermined number of articles.

21. Apparatus of the class described comprising a hopper, an outlet therefrom including a pair of relatively adjustable wedge-shaped, parallel, overlapping plates providing the outlet with a throat large in the center and tapering down to the sides of the hopper, depending pivoted plates above the wedge-shaped plates and at angles thereto, and projections on the wedge-shaped plates engaging the depending plates and swinging the same inwardly as the wedge-shaped plates are adjusted toward each other.

22. The apparatus of claim 21 including a removable replaceable article aligning plate extending into the hopper and receiving articles therefrom, and a pair of abutments on the plate limiting the inward degree of adjustment of the wedge-shaped plates.

23. Apparatus of the class described comprising a hopper, a roller at the hopper outlet in cooperation with a plate, raised parallel spaced ribs on the plates, said ribs being gradually reduced in height under the roller, the roller allowing but a single layer of articles to enter the spaces on the plate between ribs, a pivoted platform receiving the articles in the view of the operator, means providing for a certain count only of articles to reach the plate at one time, means providing for pivoting of the platform to discharge the articles, a spout for reception of the same, and vibrator means for the spout.

24. Apparatus of the class described comprising a hopper, article aligning means associated with the hopper, an article transfer device, a spout receiving the articles, means to limit the number of articles going into the transfer device, a switch to control the transfer device, a vibrator for the spout only, and connections to energize the vibrator at all times the switch is closed.

25. Apparatus for counting and delivering articles comprising a hopper, an inclined ribbed plate leading downwardly at an incline from the hopper, means to provide that a single layer of articles reaches the ribbed plate so that the articles proceed by gravity in lines down the plate between the ribs, a pivoted platform receiving the articles from the plate, the platform being in extension of the plate, a stop member to impinge on and stop the motion of all of the articles short of the platform, means to operate the latter and stop member substantially simultaneously to deliver a certain quantity only of articles.

26. The apparatus of claim 25 wherein the plate is apertured between ribs, and including means at the edges of the apertures to support the articles at the edges only thereof.

27. The apparatus of claim 25 including means to move the stop member slightly reversely relative to the direction of advance of the articles as the stop member moves to article stopping position.

28. The apparatus of claim 25 wherein said last named means is wholly under selective control of the operator, and including means requiring separate actuation by the operator for each cycle of article delivery and article stopping.

29. The apparatus of claim 25 including a removable stop member for disposition between the ribs of the plate above the pivoted platform to reduce the delivered quantity of articles at each operation of the platform.

References Cited in the file of this patent

UNITED STATES PATENTS

| | | |
|---|---|---|
| 1,647,356 | Hendry | Nov. 1, 1927 |
| 1,709,189 | Radtke | Apr. 16, 1929 |
| 2,060,645 | Suppiger et al. | Nov. 10, 1936 |
| 2,233,466 | Ayers | Mar. 4, 1941 |
| 2,523,098 | Cremieux | Sept. 19, 1950 |

FOREIGN PATENTS

| | | |
|---|---|---|
| 577,523 | Great Britain | May 21, 1946 |